United States Patent
Johnson et al.

(10) Patent No.: US 8,943,107 B2
(45) Date of Patent: Jan. 27, 2015

(54) GENERATING AND USING TEMPORAL METADATA PARTITIONS

(71) Applicant: AT&T Intellectual Property I, L.P., Atlanta, GA (US)

(72) Inventors: Theodore Johnson, New York, NY (US); Marios Hadjieleftheriou, Morristown, NJ (US); Vladislav Shkapenyuk, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 82 days.

(21) Appl. No.: 13/693,597

(22) Filed: Dec. 4, 2012

(65) Prior Publication Data

US 2014/0156642 A1   Jun. 5, 2014

(51) Int. Cl.
*G06F 17/30* (2006.01)

(52) U.S. Cl.
CPC ............................ *G06F 17/30424* (2013.01)
USPC ...................................... 707/812; 707/809

(58) Field of Classification Search
CPC ............... G06F 17/30194; G06F 17/30197; G06F 17/30224; G06F 17/30286; G06F 17/30353; G06F 17/30997; G06F 17/30489; G06F 17/3002; G06F 17/30073; G06F 17/30082; G06F 17/30345; G06F 17/30383; G06F 17/30412; G06F 17/30227; G06F 17/30041
USPC ........... 707/707, 722, 771, 812, 809; 711/129
See application file for complete search history.

(56) References Cited

U.S. PATENT DOCUMENTS

| | | | |
|---|---|---|---|
| 7,657,581 B2* | 2/2010 | Orenstein et al. | 707/661 |
| 8,271,430 B2 | 9/2012 | Willson | |
| 8,694,545 B2* | 4/2014 | Leggette | 707/793 |
| 2009/0216709 A1* | 8/2009 | Cheng et al. | 707/2 |
| 2012/0254175 A1 | 10/2012 | Horowitz et al. | |

OTHER PUBLICATIONS

18 Loading AIA Metadata to Oracle Metadata Services Repository <http://docs.oracle.com/cd/E23549_01/doc.1111/e17361/ch18.htm> Oracle® Fusion Middleware Migration Guide for Oracle Application Integration Architecture 11g Release 1 (11.1.1.4.0), Copyright 2011 [Accessed Dec. 4, 2012].
Golab, Lukasz et al., "Consistency in a Stream Warehouse," <http://www.research.att.com/export/sites/att_labs/techdocs/TD_100239.pdf> Conference on Innovative Data Systems Research (CIDR'11). 2011.
Johnson, Theodore etl al., "Bistro Data Feed Management System." <http://www.research.att.com/export/sites/att_labs/techdocs/TD_100454.pdf>, (2011).

* cited by examiner

*Primary Examiner* — Greta Robinson
(74) *Attorney, Agent, or Firm* — Hartman & Citrin LLC

(57) ABSTRACT

Concepts and technologies are disclosed herein for generating and using temporal metadata partitions. Metadata can be stored in temporal metadata partitions based upon a time range included in the metadata. Furthermore, metadata can be stored in multiple temporal metadata partitions to which the metadata is relevant. As such, metadata can be stored in manner that allows event data to be understood in the context of temporally accurate and/or relevant metadata. Functionality for executing queries of event data and providing results in view of metadata, as well as the merging of multiple temporal metadata partitions also are disclosed.

17 Claims, 6 Drawing Sheets

GENERATING AND USING TEMPORAL METADATA PARTITIONS

BACKGROUND

This application relates generally to data management. More specifically, the disclosure provided herein relates to generating and using temporal metadata partitions.

Some communications networks collect and analyze event data from various sources and/or for various purposes. The event data may relate to various network functions, elements, devices, and/or systems. Thus, the event data can include, for example, network traffic, device or system utilization information, usage statistics, packet inspection information, or the like.

Some types of data may not include any indication of a context or frame of reference for the collected and/or associated data points. For example, router utilization data may indicate a number of ports in use at a time at which the data is collected or transmitted. Such data may or may not be useful without knowing a capacity of the router, for example. Thus, some networks may store data that defines capacities of devices and/or other information that, in conjunction with the event data, can be used to determine percentage utilization or other statistics or information.

Because modern communication networks have grown exponentially over the past several years, the amount of data collected and analyzed, as well as the frequency with which data may be updated, has increased. Furthermore, some network operators have sought to rapidly expand networks to increase and/or to improve performance. Thus, some information used to understand event data may be outdated and/or otherwise useless at any particular time.

Similarly, some network operators or other data analysis entities may use historical data to understand growth and/or use of a network. For example, router utilization over time may be considered to determine when a router is to be updated or for other purposes. Because the data describing the capacity of the router may be updated when the capacity of the router changes, historical event data may be misunderstood. In particular, the historical event data may be interpreted in view of the data describing a current capacity of the router.

SUMMARY

The present disclosure is directed to generating and using temporal metadata partitions. A server computer may execute a data management application that is configured to analyze metadata received at the server computer as part of a data stream generated by a data source. The metadata may be generated by a same data source that generates event data, though this is not necessarily the case. The event data can include data points or data values and timestamps reflecting a time at which the event data is captured and/or transmitted. The metadata can include a time range that defines times between which a data value associated with the metadata applies. Thus, for example, metadata describing a router capacity may define a value corresponding to the capacity and a time range over which the capacity applies. The time range can be defined as being bound by a lower time limit and an upper time limit, an open-ended time range that begins with a lower time limit, and/or an open-ended time range that ends with an upper time limit.

The data management application can analyze the incoming metadata to identify the time range and to generate temporal metadata partitions that store the metadata associated with a particular time or ranges of time included in the time range. According to various embodiments of the concepts and technologies disclosed herein, the metadata can be saved to multiple temporal metadata partitions that are encompassed or overlapped by the time range included in the metadata. Thus, for example, metadata defining a time range from January-March may be included in temporal metadata partitions for January, February, and March. It should be understood that this embodiment is illustrative, and should not be construed as being limiting in any way.

The data management application also can be configured to consider the metadata stored in the temporal metadata partitions at query time and/or at other times. When a query is received, the data management application can determine a time associated with the query and/or execute the query against event data and determine a time based upon one or more event data query results. The data management application can identify one or more temporal metadata partitions that apply to the determined time and interpret the event data in view of the metadata. Thus, event data associated with a particular time can be interpreted in view of metadata associated with that particular time. The data management application also can be configured to merge temporal metadata partitions to reduce storage space associated with the metadata. The temporal metadata partitions can be merged by merging values or time ranges and storing the merged temporal metadata partitions in the data store.

According to one aspect of the concepts and technologies disclosed herein, a method is disclosed. The method can include obtaining metadata at a server computer executing a data management application. The metadata can include a data value and a time range associated with the data value. The method also can include analyzing, by the server computer, the time range to identify a temporal metadata partition in which the metadata is to be stored, and storing, by the server computer, the metadata in the temporal metadata partition.

In some embodiments, the method also can include determining, based upon the time range, if the metadata is to be stored in a further temporal metadata partition, and in response to a determination that the metadata is to be stored in the further temporal metadata partition, storing the metadata in the further temporal metadata partition. The metadata can be included in a data stream generated by a data source. In some embodiments, the data stream can include the metadata and event data, and the metadata can define a context of the event data. The method also can include receiving a query, executing the query against event data stored in a temporal data partition to obtain an event data query result, identifying, in the event data query result, a timestamp, and retrieving the metadata from a relevant temporal metadata partition based upon the timestamp. The method also can include computing results based upon the metadata and the event data, and outputting the results.

In some embodiments, the metadata can provide a context of the event data and computing the results can include selecting event data based, at least partially, upon the metadata. The method also can include determining, based upon the time range, that the metadata is to be stored in a further temporal metadata partition, storing the metadata in the further temporal metadata partition, determining that the temporal metadata partition and the further temporal metadata partition are to be merged, and merging the temporal metadata partition and the further temporal metadata partition. The method also can include determining that the temporal metadata partition and the further temporal metadata partition are to be merged by selecting the temporal metadata partition, and identifying the further temporal metadata partition as a related temporal metadata partition. The method also can include merging the temporal metadata partition and the further temporal metadata partition by merging a time range of the temporal metadata partition with a further time range of the further temporal metadata partition to generate a merged temporal metadata partition having a merged time range and a data value, and storing the merged temporal metadata partition.

According to another aspect of the concepts and technologies disclosed herein, a system is disclosed. The system can include a processor and a memory storing computer-executable instructions. When the computer-executable instructions are executed by the processor, the processor can perform operations including obtaining metadata including a data value and a time range associated with the data value, analyzing the time range to identify a temporal metadata partition in which the metadata is to be stored, determining, based upon the time range, that the metadata is to be stored in a further temporal metadata partition, storing the metadata in a further temporal metadata partition, and storing the metadata in the temporal metadata partition.

In some embodiments, the computer-executable instructions, when executed by the processor, can cause the processor to perform operations that can further include receiving a query, executing the query against event data stored in a temporal data partition to obtain an event data query result, identifying, in the event data query result, a timestamp, and retrieving the metadata from a relevant temporal metadata partition based upon the timestamp. The computer-executable instructions, when executed by the processor, can further cause the processor to perform operations that include computing results based upon the metadata and the event data, and outputting the results. The computer-executable instructions, when executed by the processor, can cause the processor to perform operations that include determining that the temporal metadata partition and the further temporal metadata partition are to be merged, and merging the temporal metadata partition and the further temporal metadata partition.

In some embodiments, the computer-executable instructions, when executed by the processor, can cause the processor to perform operations that include determining that the temporal metadata partition and the further temporal metadata partition are to be merged by selecting the temporal metadata partition, and identifying the further temporal metadata partition as a related temporal metadata partition. The computer-executable instructions, when executed by the processor, also can cause the processor to perform operations that include merging the temporal metadata partition and the further temporal metadata partition by merging a time range of the temporal metadata partition with a further time range of the further temporal metadata partition to generate a merged temporal metadata partition having a merged time range and a data value, and storing the merged temporal metadata partition.

According to yet another aspect, a computer storage medium is disclosed. The computer storage medium can have computer-executable instructions stored thereon. The computer-executable instructions, when executed by a processor, can cause the processor to perform operations including obtaining metadata including a data value and a time range associated with the data value, analyzing the time range to identify a temporal metadata partition in which the metadata is to be stored, determining, based upon the time range, that the metadata is to be stored in a further temporal metadata partition, storing the metadata in a further temporal metadata partition, and storing the metadata in the temporal metadata partition.

In some embodiments, the computer-executable instructions, when executed by the processor, can cause the processor to perform operations further including receiving a query, executing the query against event data stored in a temporal data partition to obtain an event data query result, identifying, in the event data query result, a timestamp, and retrieving the metadata from a relevant temporal metadata partition based upon the timestamp. The computer-executable instructions, when executed by the processor, can cause the processor to perform operations further including determining that the temporal metadata partition and the further temporal metadata partition are to be merged, and merging the temporal metadata partition and the further temporal metadata partition.

In some embodiments, the computer-executable instructions, when executed by the processor, can cause the processor to perform operations further including determining that the temporal metadata partition and the further temporal metadata partition are to be merged by selecting the temporal metadata partition, and identifying the further temporal metadata partition as a related temporal metadata partition. The computer-executable instructions, when executed by the processor, can cause the processor to perform operations further including merging the temporal metadata partition and the further temporal metadata partition by merging a time range of the temporal metadata partition with a further time range of the further temporal metadata partition to generate a merged temporal metadata partition having a merged time range and a data value, and storing the merged temporal metadata partition. In some embodiments, the metadata can be included in a data stream generated by a data source, the data stream can include the metadata and event data, the metadata can define a context of the event data, and the temporal metadata partitions can be stored at a distributed database.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
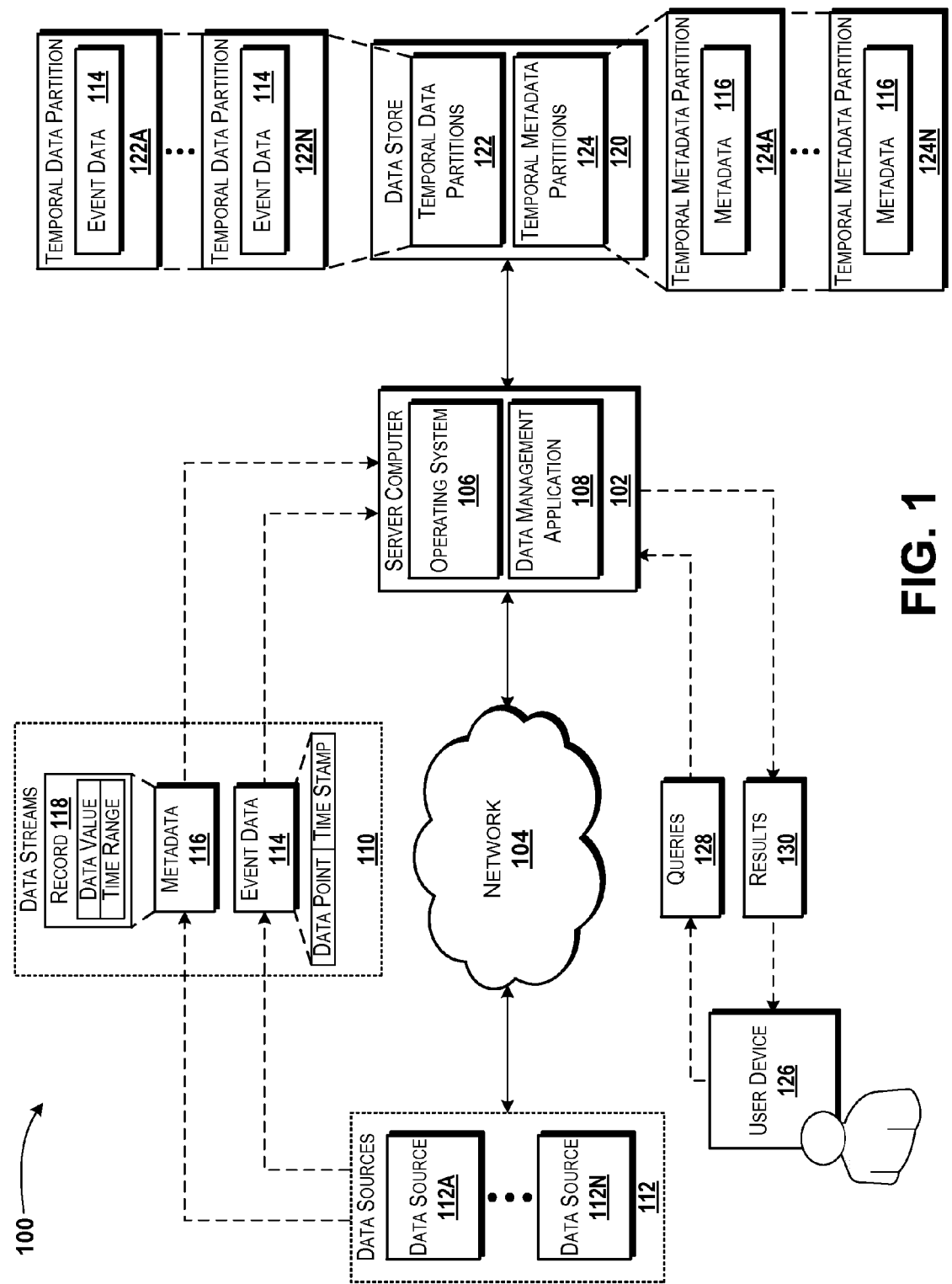
FIG. 1 is a system diagram illustrating an illustrative operating environment for the various embodiments disclosed herein.

The following detailed description is directed to generating and using temporal metadata partitions. A server computer can execute a data management application. The data management application can be configured to analyze metadata received at the server computer as part of a data stream generated by a data source. The data stream also can include event data that can include data points and timestamps reflecting one or more times at which the event data is captured and/or transmitted. The metadata can include a time range that defines times between which a data value included in the metadata applies. The time range can be defined as being bound by a lower time limit and an upper time limit. The time range also can be defined as an open-ended time range having only a lower time limit or only an upper time limit.

The data management application can analyze the metadata to identify a time range associated with the metadata. The data management application can store the metadata in one or more temporal metadata partitions corresponding to a particular time, times, or time ranges included in the time range of the metadata. The metadata can be stored in multiple temporal metadata partitions that overlap the time range included in the metadata. The data management application also can be configured to merge temporal metadata partitions to reduce storage space associated with the metadata. The temporal metadata partitions can be merged by merging values or time ranges and storing the merged temporal metadata partitions in the data store.

The data management application also can use the metadata stored in the temporal metadata partitions at query time and/or at other times. When a query is received, the data management application can determine a time associated with the query and/or execute the query against event data and determine a time based upon one or more event data query results. The data management application can identify one or more temporal metadata partitions that apply to the determined time and interpret the event data in view of the metadata. As such, embodiments of the concepts and technologies disclosed herein can be used to allow event data to be interpreted and/or analyzed in view of temporally appropriate and/or otherwise relevant metadata.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for generating and using temporal metadata partitions will be described, according to an illustrative embodiment. The operating environment 100 shown in FIG. 1 includes a computing device such as a server computer ("server computer") 102. While referred to herein as a "server computer," it should be understood that in various embodiments of the concepts and technologies disclosed herein the functionality of the server computer 102 can be provided by other computing systems such as, for example, desktop computers, laptop computers, other computing systems, combinations thereof, or the like. Thus, the example embodiments of the server computer 102 described herein as a web server or other server computer are illustrative and should not be construed as being limiting in any way.

The server computer 102 can be configured to operate in communication with and/or as part of a communications network ("network") 104. Thus, communications described herein as occurring with or via the server computer 102 should be understood as being capable of occurring via the network 104. The server computer 102 can execute an operating system 106 and one or more application programs such as, for example, a data management application 108 and/or other application programs (not illustrated). The operating system 106 can include a computer program for controlling the operation of the server computer 102. The data management application 108 can include an executable program configured to execute on top of the operating system 106 to provide the functionality described herein for generating and using temporal data partitions.

The data management application 108 can be configured to obtain and manage storage of data associated with one or more streams of data ("data streams") 110. The data streams 110 can be received or otherwise obtained from one or more data sources 112A-N (hereinafter collectively and/or generically referred to as "data sources 112"). As shown in FIG. 1, the data streams 110 can include event data 114 and metadata 116. The event data 114 and the metadata 116 are described in more detail below.

According to various embodiments, the data sources 112 can correspond to one or more real or virtual data storage devices, server computers, network reporting devices or systems, network analytics devices, traffic monitors, deep packet inspection ("DPI") devices or systems, combinations thereof, or the like. As such, the event data 114 included in the data streams 110 can correspond to various types of streaming data including, but not limited to, network statistics, stored data, media streams, packet inspection information, user information, traffic information, device output information, analytics, performance statistics, device utilization and/or availability information, combinations thereof, or the like.

The metadata 116 included in the data streams 110 can be used to provide context for the event data 114. Thus, for example, if the event data 114 corresponds to a router utilization such as a number of occupied ports, the metadata 116 can correspond to an indication of a number of available ports associated with the router. Thus, a percent utilization of the router can be computed, in some embodiments, by analyzing the event data 114 in light of the metadata 116. This and other aspects of using the metadata 116 are described in additional detail below. Because the data sources 112, their respective data streams 110, the event data 114, and/or the metadata 116 can include almost any type of sources and/or types of data, it should be understood that the above examples are illustrative and should not be construed as being limiting in any way.

As shown in FIG. 1, the event data 114 included in the data streams 110 can include data points and timestamps. Similarly, the metadata 116 included in the data streams 110 can include one or more records 118. A single record 118 is shown in FIG. 1 to simplify illustration and description of the concepts and technologies disclosed herein, and not to limit the disclosure in any way. In light of the above, it should be understood that the illustrated record 118 can include multiple records 118. As such, the description herein refers to multiple records 118 and/or references a single record 118 as a generic representation thereof.

One or more records 118 can include a data value or other data point ("data value") and a time range with which the data value is associated. According to various embodiments, though not illustrated in FIG. 1, the time range of the records 118 can be defined by a lower time limit $t_l$ and an upper time limit $t_h$, though this is not necessarily the case. As such, the time range of the records 118 can be denoted as $(t_l, t_h)$. In some instances, the time ranges may include and/or may be denoted as having a only lower time limit $t_l$ or only an upper time limit $t_h$. Thus, a time range of the records 118 can indicate that a particular value of the records 118 applies at any time after a particular lower time limit $t_l$ for records 118 having only a lower time limit $t_l$. Similarly, a time range can indicate a particular value as applying at any time before a particular upper time limit $t_h$ for records 118 having only an upper time limit $t_h$. Thus, time ranges can also be denoted as $(t_l, -)$ and/or $(-, t_h)$ in addition to, or instead of, $(t_l, t_h)$. It should be understood that these embodiments are illustrative, and should not be construed as being limiting in any way.

The data value of the record 118 can include an integer value; a string; a Boolean value such as 0/1, true/false, yes/no, or the like; a function; combinations thereof; or the like. As such, the record 118 can, by including the data value and the time range, represent a data value that applies over a particular temporal limitation such as the time range. As mentioned above, the metadata 116 can be used by the server computer 102 to provide context for the event data 114. Thus, the time range and the data value can be used by the server computer 102 to interpret event data 114, as will be explained in more detail below.

The data management application 108 can be configured to obtain the event data 114, the metadata 116, and/or other data associated with the data streams 110. The server computer 102 also can be configured to store the event data 114 or the metadata 116, or to generate instructions for other devices or software to store the event data 114 and/or the metadata 116 in a data storage device such as, for example, the data store 120. According to various embodiments of the concepts and technologies disclosed herein, the functionality of the data store 120 can be provided by one or more databases, server computers, hard disk drives, memory devices, desktop computers, laptop computers, other computing devices, other data storage devices, combinations thereof, or the like. It should be understood that the data store 120 also can include or can be provided by a real or virtual data storage device and/or a collection of multiple data storage devices. For purposes of illustrating the concepts and technologies disclosed herein, the functionality of the data store 120 is described herein as being provided by a server computer hosting a database. In view of the above-described contemplated embodiments, it should be understood that this example of the data store 120 is illustrative, and should not be construed as being limiting in any way.

As shown in FIG. 1, the data management application 108 can be configured to obtain the event data 114 and the metadata 116, though not necessarily at the same time, and to store these and/or other data as tables, records, and/or other types of data or data structures. In the illustrated embodiment, the data management application 108 can be configured to store the event data 114 in one or more temporal data partitions 122A-N (hereinafter collectively and/or generically referred to as "temporal data partitions 122"). Thus, the temporal data partitions 122 can include one or more instances of data extracted from or included in the event data 114 that can include a data point and a timestamp. Because the event data 114 can be stored in additional and/or alternative formats, it should be understood that this embodiment is illustrative, and should not be construed as being limiting in any way.

The data management application 108 also can be configured to store the metadata 116 in one or more temporal metadata partitions 124A-N (hereinafter collectively and/or generically referred to as "temporal metadata partitions 124"). Although not visible in FIG. 1, the metadata 116 stored in the temporal metadata partitions 124 can include one or more records such as, for example, the record 118. Thus, the metadata 116 stored in the temporal metadata partitions 124 can include data having data values and time ranges. The storage of the metadata 116 in the temporal metadata partitions 124 is described in additional detail below, particularly with reference to FIG. 2.

The data management application 108 also can be configured to communicate with one or more computing devices such as, for example, the user device 126 shown in FIG. 1 to satisfy one or more request. According to various embodiments, for example, the user device 126 can generate one or more queries 128 relating to the event data 114. As will be explained in more detail herein, the data management application 108 can be configured to receive the queries 128 and to execute the queries 128 against the event data 114. The data management application 108 also can be configured to consider the metadata 116 when executing the queries 128 against the event data 114. The metadata 116 can be considered by the data management application 108 to impart meaning to one or more results 130 obtained by the data management application 108 during execution of the queries 128.

In particular, as explained above, the event data 114 may correspond, for example, to raw measurements or other types of data that may lack context for interpretations. Thus, for example, if the event data 114 corresponds to router utilization statistics such as a number of occupied ports, the event data 114 may provide a raw number such as eighty, two thousand, or the like. The event data 114 may not, however, provide context for that information such as, for example, a total number of available ports at the router. Thus, the data management application 108 may be unable to interpret the event data 114 without some metadata 116, which can be used to represent, for example, the total number of available ports at the router.

Another complication may be experienced with regard to the lack of context. In particular, metadata such as the metadata 116 described herein may be stored as a table or other data structure and may be used to interpret the event data 114. The metadata 116, however, may not be stored in a temporal partition that can represent changes to the metadata 116 over time. Thus, for example, if the router at issue in the above example had a total capacity of one thousand ports, the metadata 116 may represent this capacity. If, however, the router is updated at some time from having a capacity of one thousand ports to having a capacity of two thousand ports, the metadata 116 may be updated as well. Thus, if a user queries the event data 114 for router capacity information at some time prior to the updating of the router, the metadata 116 indicating a capacity of two thousand ports may be used to interpret the event data 114, although the update may not yet have occurred when the considered event data 114 was captured.

To address this and other considerations, embodiments of the concepts and technologies disclosed herein support storage of the metadata 116 in temporal metadata partitions 124. The temporal metadata partitions 124 can be relevant to particular times and/or time ranges, and metadata 116 can be stored in the temporal metadata partitions 124 based upon time ranges included in records 118 of the metadata 116. Thus, for example, the metadata 116 can be stored in a number of temporal metadata partitions 124 to which the metadata 116 is relevant. In the illustrated embodiment of FIG. 1, a first temporal metadata partition 124A can store the metadata 116 as being relevant to a first time or time range, and an nth temporal metadata partition 124N can store the same metadata 116 as being relevant to an nth time or time range. Thus, metadata 116 can be stored to any number of temporal metadata partitions 124 that include times or time ranges to which the metadata 116 applies.

In an embodiment of the data management application 108, metadata 116 is obtained at the server computer 102 and analyzed by the data management application 108 to identify a time range of the metadata 116. The data management application 108 identifies a temporal metadata partition 124 to which the time range of the metadata 116 corresponds and copies the metadata 116 to the identified temporal metadata partition 124. The data management application 108 can repeat these operations to store the metadata 116 into a number of temporal metadata partitions 124 that overlap the time range of the metadata 116. Thus, for example, if the temporal metadata partitions 124 are divided into time ranges covering one month, and if the metadata 116 includes a time range of one year, the metadata 116 can be copied into twelve temporal metadata partitions 124, one for each month. Because other time ranges and/or time increments of the metadata 116 and/or the temporal metadata partitions 124 are possible and are contemplated, it should be understood that this embodiment is illustrative, and should not be construed as being limiting in any way.

Embodiments of the concepts and technologies disclosed herein also support merging of temporal metadata partitions 124 to save or create storage space at the data store 120. The data management application 108 can be configured to select a temporal metadata partition 124 and to identify one or more related temporal metadata partitions 124. It can be appreciated that multiple temporal metadata partitions 124 may be related based upon time ranges, data values, and/or other aspects of the metadata 116 stored by the temporal metadata partitions 124. Thus, the data management application 108 can identify related temporal metadata partitions 124 and merge the temporal metadata partitions 124.

If the temporal metadata partitions 124 contain metadata 116 having similar or identical data values but disparate time ranges, the temporal metadata partitions 124 can be merged to reflect the same data value(s) and a combined time range that includes or encompasses multiple time ranges associated with the multiple temporal metadata partitions 124. Additionally, or alternatively, if the time ranges of the temporal metadata partitions 124 are the same or similar, but the data values are disparate, the data management application 108 can be configured to merge the temporal metadata partitions 124 by combining the data values (if applicable) and reflecting the same time range(s). Additional details of merging temporal metadata partitions 124 are set forth below with reference to FIG. 4.

FIG. 1 illustrates one server computer 102, one network 104, two data sources 112, one data store 120, and one user device 126. It should be understood, however, that various implementations of the operating environment 100 include multiple server computers 102; multiple networks 104; less than two, two, and/or more than two data sources 112; multiple data stores 120; and/or multiple user devices 126. As such, the illustrated embodiment should be understood as being illustrative, and should not be construed as being limiting in any way.

Figure 2:
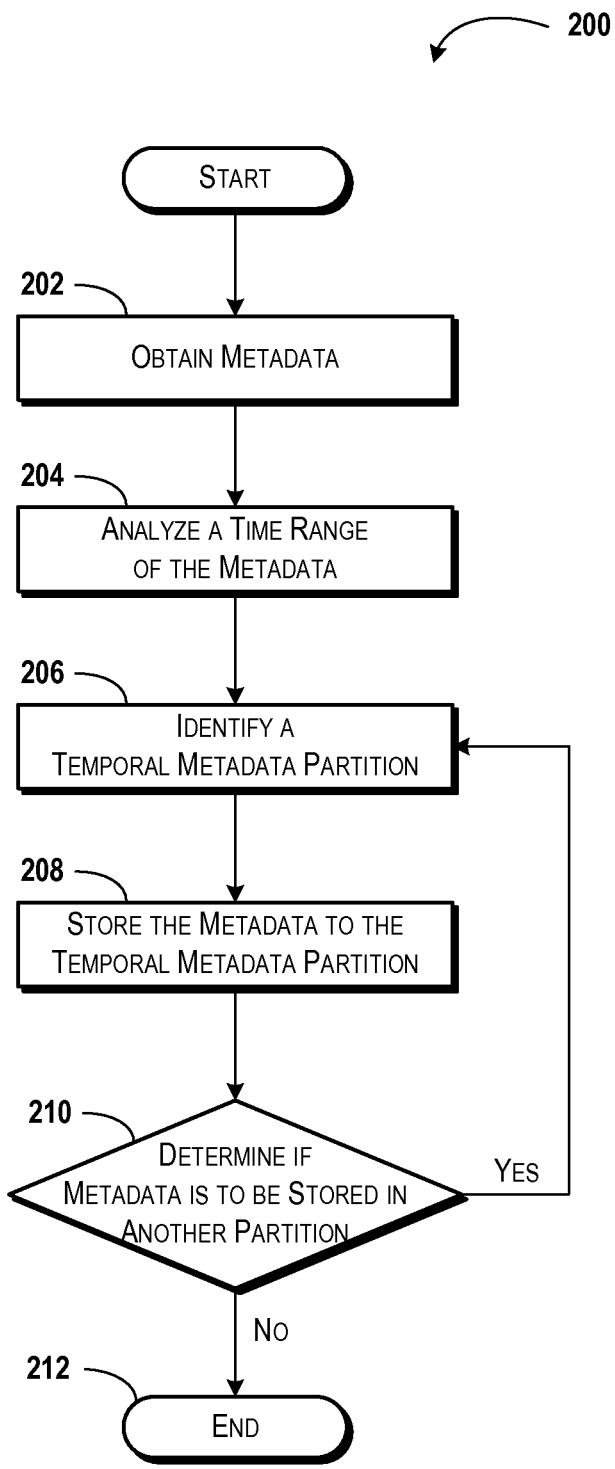
FIG. 2 is a flow diagram showing aspects of a method for storing metadata in multiple temporal metadata partitions, according to an illustrative embodiment.

Turning now to FIG. 2, aspects of a method 200 for storing metadata in multiple temporal metadata partitions will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the data management application 108. It should be understood that additional and/or alternative devices and/or network nodes can provide the functionality described herein via execution of one or more modules, applications, and/or other software including, but not limited to, the data management application 108. Thus, the illustrated embodiments are illustrative, and should not be viewed as being limiting in any way.

The method 200 begins at operation 202, wherein the server computer 102 obtains metadata 116. According to various implementations of the concepts and technologies disclosed herein, the server computer 102 can obtain the metadata 116 as, or as a part of, a data stream 110 that can be received, retrieved, and/or otherwise obtained by the server computer 102. According to various embodiments, the data sources 112 can be configured to stream the metadata 116 in or as the data streams 110 to the server computer 102. The metadata 116 may be reported at or according to almost any time, frequency, or schedule such as, for example, once a second, once a minute, once an hour, once a day, once a week, once a month, other times, combinations thereof, or the like. The event data 114 may be streamed to the server computer 102 at or according to the same and/or different frequencies, intervals, times, and/or schedules.

In one contemplated embodiment, the metadata 116 is streamed to the server computer 102 as a daily report on changes made to the network 104 and/or a portion thereof. In some other embodiments, the metadata 116 is streamed to the server as temporal releases of metadata 116 by the data sources 112 at five minutes intervals, hourly, daily, weekly, monthly, combinations thereof, or the like. Thus, the metadata 116 obtained in operation 202 can correspond to a temporal release of the metadata 116 in one or more of the data streams 110, though this is not necessarily the case.

As illustrated in FIG. 1, the metadata 116 obtained in operation 202 can include a record 118 that has a data value and a time range. Because multiple records 118 can be received or otherwise obtained by the server computer 102 at operation 202, it should be understood that the example of one record 118 as shown in FIG. 1 is merely illustrative and is provided to simplify description of the concepts and technologies disclosed herein. Thus, this example is illustrative, and should not be construed as being limiting in any way.

From operation 202, the method 200 proceeds to operation 204, wherein the server computer 102 analyzes the time range included in the record 118 of the metadata 116. The time range can define at least one of a lower time limit $t_l$ and an upper time limit $t_h$. In some embodiments, a particular data value included in the record 118 may apply from the lower time limit $t_l$ until a present time, and as such an upper time limit $t_h$ may not be included in the record 118. In the described embodiment of the method 200, the record 118 is described as including the lower time limit $t_l$ and the upper time limit $t_h$. Thus, the server computer 102 can analyze, in operation 204, the time range defined by these two limits to define the range over which the data value included in the record 118 applies.

By way of example, the record 118 may include a data value of forty. Similarly, the record 118 may include a lower time limit $t_l$ that specifies a time of Jan. 28, 2017 08:17:24 AM and an upper time limit $t_h$ that specifies a time of Jan. 28, 2018 11:52:17 AM. In this example, the server computer 102 can be configured to analyze the record 118 to define a range between these two times as the time range over which the data value forty applies. Because the record 118 can include almost any data value in almost any format and over almost any time range, it should be understood that this embodiment is illustrative, and should not be construed as being limiting in any way.

From operation 204, the method 200 proceeds to operation 206, wherein the server computer 102 identifies a temporal metadata partition 124 to which the metadata 116 obtained in operation 202 is to be stored. The server computer 102 can be configured to analyze the time range analyzed in operation 204, as well as time ranges and/or time values of the temporal metadata partitions 124 stored at the data store 120. In some embodiments, as explained above, the server computer 102 can be configured to include a time range or time value in a name of the temporal metadata partitions 124. As such, the server computer 102 can be configured to analyze names of the temporal metadata partitions 124 in operation 206 to identify the temporal metadata partition 124 to which the metadata 116 is to be copied based upon the time range included in the metadata 116.

Thus, for example, if the metadata 116 includes the time range set forth in the example described with respect to operation 204 above, the server computer 102 can determine that a temporal metadata partition 124 including values having timestamps including a date in May, 2017, and/or having a name or title indicating such a time indication, is a temporal metadata partition 124 to which the metadata 116 is to be copied. It should be understood that this embodiment is illustrative, and should not be construed as being limiting in any way.

From operation 206, the method proceeds to operation 208, wherein the server computer 102 stores the metadata 116 obtained in operation 202 to the temporal metadata partition 124 identified in operation 206. Thus, the temporal metadata partition 124 identified in operation 206 can include the record 118 included in the metadata 116 received in operation 202.

From operation 208, the method 200 proceeds to operation 210, wherein the server computer 102 can determine if the metadata 116 is to be stored in another temporal metadata partition 124. Thus, the server computer 102 can be configured to examine the names and/or contents of the temporal metadata partitions 124 to identify another temporal metadata partition 124 to which the metadata 116 is to be copied. Thus, in the above example of the metadata 116 that includes a time range from Jan. 28, 2017 through Jan. 28, 2018, the server computer 102 can identify one or more temporal metadata partitions 124 that include time ranges or points within that time range. Thus, for example, a temporal metadata partition 124 that includes data for February of 2017 can be identified, as can temporal metadata partitions 124 that include data for March, 2017, April, 2017, May, 2017, or the like.

If the server computer 102 determines, in operation 210, that the metadata 116 is to be copied to another temporal metadata partition 124, the method 200 can return to operation 206, wherein the server computer 102 can identify another temporal metadata partition 124. Thus, it can be appreciated that operations 206-210 can be repeated by the server computer 102 until the metadata 116 has been copied to each of the temporal metadata partitions 124 that include time-based data within the time range included in the metadata 116.

It can be appreciated from the above description of operations 202-210 that, a record 118 associated with the metadata 116 can be copied to multiple temporal data partitions 124 by the server computer 102. As such, when a temporal metadata partition 124 is retrieved for execution of a query 128 against the event data 114 stored in the temporal data partitions 122 described herein, the record 118 can be included in the temporal metadata partition 124. An example method for executing a query 128 using temporal metadata partitions 124 is set forth in additional detail below with reference to FIG. 3.

From operation 210, the method 200 proceeds to operation 212. The method 200 ends at operation 212.

Figure 3:
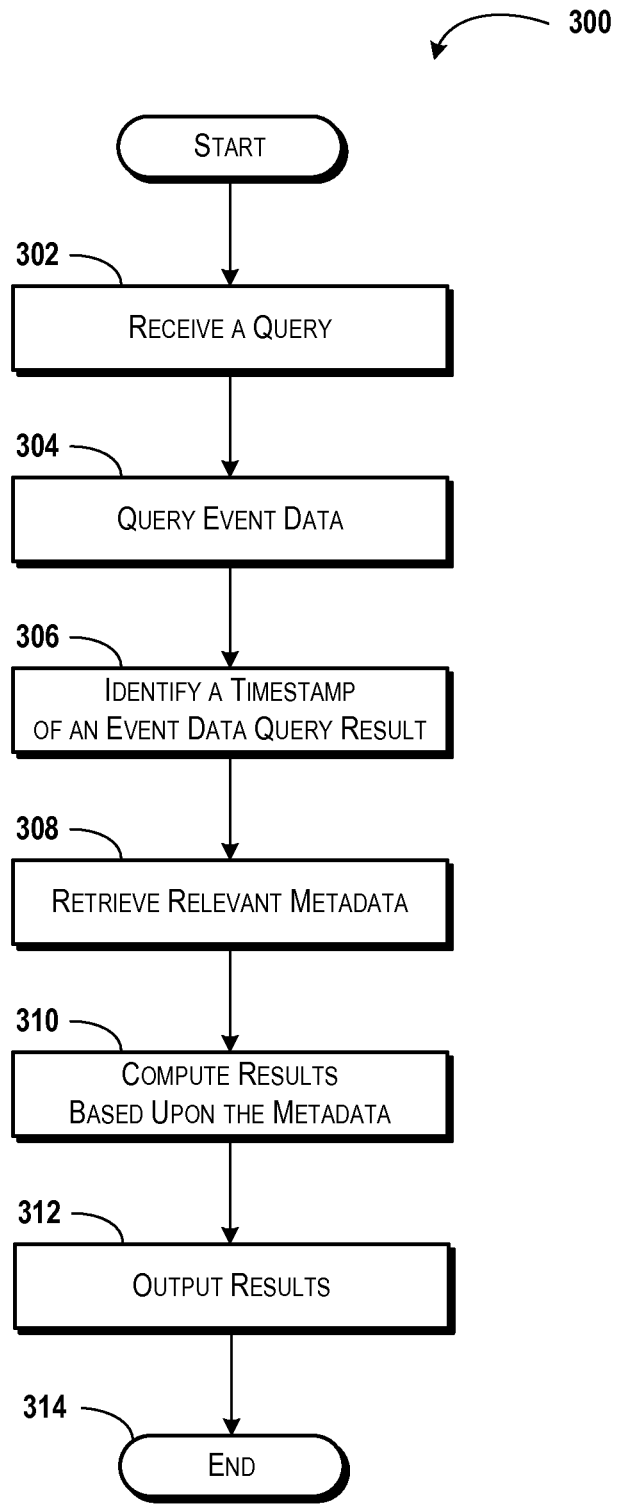
FIG. 3 is a flow diagram showing aspects of a method for executing a query against event data using metadata stored in temporal metadata partitions, according to another illustrative embodiment.

Turning now to FIG. 3, aspects of a method 300 for executing a query against event data using metadata stored in temporal metadata partitions will be described in detail, according to an illustrative embodiment. The method 300 begins at operation 302, wherein the server computer 102 receives a query 128. The query 128 received in operation 202 can include a query 128 received from a requestor such as, for example, a network data analysis system, network operations personnel, and/or a consumer or user of the event data 114 such as the user device 126. In some embodiments, the query 128 can correspond to a standing query executed periodically by the server computer 102 and/or one or more reporting devices in communication with the server computer 102.

In some embodiments, the query 128 received in operation 302 can correspond to a query 128 that is to be executed against the event data 114 stored in the temporal data partitions 122 at the data store 120. Thus, for example, the event data 114 can correspond to router utilization data and the query 128 can correspond to a request for data about router utilization percentage calculation. Because the query 128 can be executed against other types of event data 114, it should be understood that this embodiment is illustrative, and should not be construed as being limiting in any way.

From operation 302, the method 300 proceeds to operation 304, wherein the server computer 102 executes the query 128 against the event data 114. Thus, the server computer 102 can, by executing the query 128 against the event data 114, identify one or more records or other data points included in the event data 114 that correspond to or are responsive to the query 128 received in operation 302. It should be understood that the server computer 102 can be configured to call a query device or application and/or that the server computer 102 can execute one or more query applications for executing the query 128. As such, operation 304 can include, in some embodiments, invoking functionality associated with a query application via a program call and/or via invoking a query application via an application programming interface exposed by a query application or query device. By executing the query 128 against the event data 114, the server computer 102 can identify an event data query result.

From operation 304, the method 300 proceeds to operation 306, wherein the server computer 102 identifies a timestamp of an event data query result. Because the event data 114 stored in the temporal data partitions 122 can include timestamps, the server computer 102 can be configured to identify a timestamp of the event data 114 included in the event data query result in operation 306. Because the server computer 102 can identify multiple event data query results in operation 304, it should be understood that the server computer 102 can repeat operation 306 to identify a timestamp associated with one or more event data query results, though this is not the case. As such, the example of a timestamp as described herein should be understood as being illustrative and should not be construed as being limiting in any way.

From operation 306, the method 300 proceeds to operation 308, wherein the server computer 102 retrieves relevant metadata 116 from the temporal metadata partitions 124. According to various embodiments, the server computer 102 can identify "relevant" metadata 116 by identifying a timestamp or time range associated with an event data query result and/or the query 128. Thus, for example, if the query 128 requests router data associated with a particular time such as, for example, the month of February 2017, the server computer 102 can identify temporal metadata partitions 124 that include metadata 116 having time ranges that encompass or overlap February 2017. Because the server computer can identify temporal metadata partitions 124 in additional or alternative ways, it should be understood that this embodiment is illustrative, and should not be construed as being limiting in any way.

From operation 308, the method 300 proceeds to operation 310, wherein the server computer 102 applies the metadata 116 retrieved in operation 308 to the event data result obtained in operation 304. As explained herein, the metadata 116 can provide context for the event data 114 and/or an event data result based thereon. For example, if a query 128 relates to a particular user's data plan and/or usage in a particular month, the server computer 102 can query event data 114 that includes data usage of the user in that month. The metadata 116 can provide, for example, an indication of what the user's plan was (e.g., ten GB per month, twenty GB per month, or the like) at the time the event data 114 was recorded.

To illustrate the usefulness of temporally partitioned metadata 116, metadata 116 stored in a first temporal metadata partition 124 may indicate a plan of ten GB per month from January-July of 2017. Metadata 116 stored in a second temporal metadata partition 124 may indicate a plan of twenty GB per month from August-September of 2017. Thus, if the event data 114 indicates a consumption of fifteen GB, the metadata 116 can be used to collectively indicate (with the event data 114) that the user used 150% or 75% of his or her plan, depending upon which metadata 116 is relevant to the event data 114. If the timestamp of the event data 114 indicates, for example, August, 2017, the server computer 102 can interpret the event data 114 in view of the metadata 116 stored in the second temporal metadata partition. Thus, it can be understood that the storage of metadata 116 in temporal metadata partitions 124 as disclosed herein can be used to understand and/or impart meaning to event data 114. It should be understood that the above example is illustrative and should not be construed as being limiting in any way.

As explained above, the server computer 102 can identify multiple results in the query of the event data 114 in operation 304. As such, the server computer 102 can iterate operation 310 for each of the event data query results. Thus, the server computer 102 can be configured to apply relevant metadata 116 to each of the event data query results, in some embodiments.

From operation 312, the method 300 proceeds to operation 314, wherein the server computer 102 outputs results 130. The results 130 output by the server computer 102 in operation 314 can correspond to the event data 114 as interpreted in view of the applied metadata 116 from the relevant temporal metadata partitions 124. As such, embodiments of the concepts and technologies disclosed herein can be used to respond to queries 128 using metadata 116 stored in temporal metadata partitions 124.

From operation 312, the method 300 proceeds to operation 314. The method 300 ends at operation 314.

Figure 4:
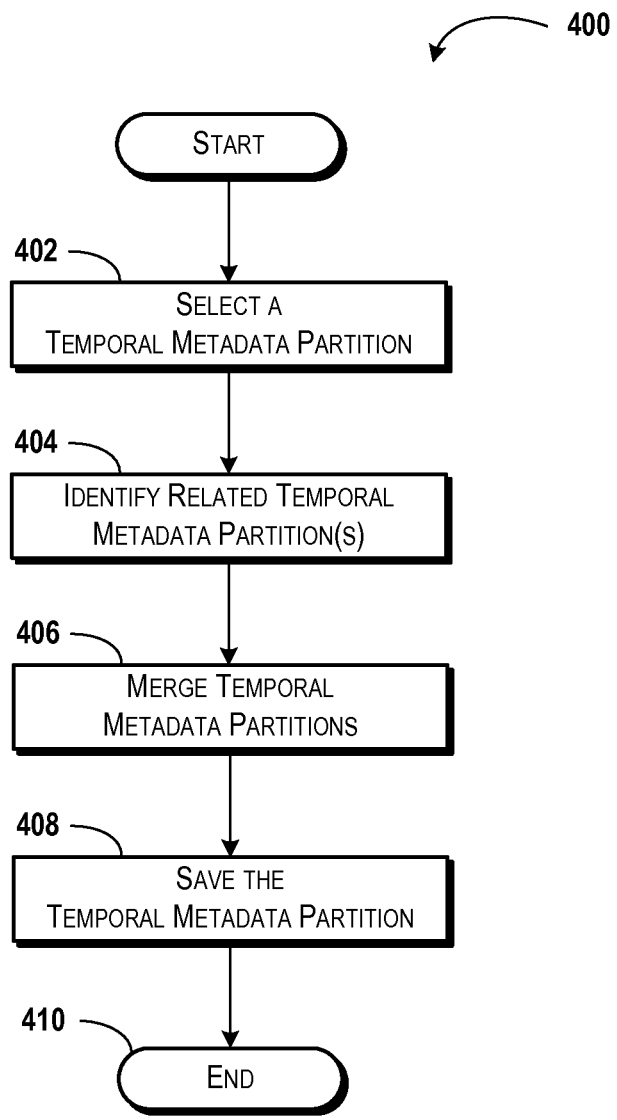
FIG. 4 is a flow diagram showing aspects of a method for merging temporal metadata partitions, according to another illustrative embodiment.

Turning now to FIG. 4, aspects of a method 400 for merging temporal metadata partitions will be described in detail, according to an illustrative embodiment. The method 400 begins at operation 402, wherein the server computer 102 can select a temporal metadata partition 124. In some embodiments, the selection of the temporal metadata partition 124 can correspond to the server computer 102 selecting a temporal metadata partition 124 that is to be merged with another temporal metadata partition 124.

The server computer 102 can determine that temporal metadata partitions 124 are to be merged based upon a command or other trigger event. For example, the server computer 102 can be configured to merge temporal metadata partitions 124 in response to receiving a command to merge temporal metadata partitions 124, detecting storage of a certain number of records 118 in the temporal metadata partitions 124, detecting expiration of a timer that can be initiated with each temporal metadata partition 124 merge operation, passage of a particular amount of time since a last merge process, execution of a number of queries 128 or other actions, storage of a particular number of temporal metadata partitions 124, combinations thereof, or the like.

It should be understood that a number of temporal metadata partitions 124 or operations, an amount of time, and/or other amounts or number of events or items that may trigger a merge operation for temporal metadata partitions 124 can be defined in various ways. For example, these and other trigger conditions may be defined by system or user settings, options, or the like. Because merging of temporal metadata partitions 124 can be initiated for additional and/or alternative reasons, it should be understood that the above examples are illustrative, and should not be construed as being limiting in any way.

Upon detecting a trigger to merge the temporal metadata partitions 124, the server computer 102 can select a temporal metadata partition 124.

From operation 402, the method 400 proceeds to operation 404, wherein the server computer 102 identifies temporal metadata partitions 124 related to the temporal metadata partition selected in operation 402. The server computer 102 can determine that a temporal metadata partition 124 is related to another temporal metadata partition 124, for example, by determining that a particular record 118 is stored in both temporal metadata partitions 124, by determining that a time range included in the records 118 of multiple temporal metadata partitions 124 overlap, based upon keys, identifiers, and/or other data included in the temporal metadata partitions 124, combinations thereof, or the like. Because the server computer 102 can identify related temporal metadata partitions in additional and/or alternative ways, it should be understood that these embodiments are illustrative, and should not be construed as being limiting in any way. The server computer 102 can be configured to repeat operation 404 until the server computer 102 determines that no additional related temporal metadata partitions 124 exist. Thus, the server computer 102 can identify, by repeating operation 404, all related temporal metadata partitions 124 stored at the data store 120.

From operation 404, the method 400 proceeds to operation 406, wherein the server computer 102 can merge the related temporal metadata partitions 124 identified in operations 402-404. In operation 406, the server computer 102 can merge the temporal metadata partitions 124 by merging data values of records 118 having a similar or identical time range, by merging time ranges of records 118 having a similar or identical data value, and/or by taking other actions to merge records 118 of the temporal metadata partitions 124.

In some embodiments, the time ranges of the related temporal metadata partitions 124 can be merged to reflect time ranges of the multiple temporal metadata partitions 124. Thus, for example, if time ranges of temporal metadata partitions 124 are represented as $(t_l, t_h)$, time ranges of temporal metadata partitions 124 can be represented, respectively, as $(t_{l1}, t_{h1})$ and $(t_{l2}, t_{h2})$. Thus, in a merge operation, the server computer 102 can be configured to determine an earlier or later time among $t_{l1}, t_{l2}$ and an earlier or later time among $t_{h1}, t_{h2}$. In one contemplated embodiment, the server computer 102 selects a lowest time among the lower time limits $t_{l1}, t_{l2}$ and a highest time among the upper time limits $t_{h1}, t_{h2}$ and modifies the time range of the temporal metadata partition 124 to reflect a time range with these selected time limits. Thus, the example temporal metadata partitions 124 above can be merged to obtain new temporal metadata partition 124 having a time range $(t_{l1}, t_{h2})$. Because the temporal metadata partitions 124 can be merged in additional and/or alternative ways, it should be understood that this embodiment is illustrative, and should not be construed as being limiting in any way.

Similarly, the server computer 102 can be configured to merge temporal metadata partitions 124 by merging data values of the temporal metadata partitions 124 and maintaining the time ranges of the temporal metadata partitions 124. Thus, for example, if time ranges of two or more temporal metadata partitions 124 are represented as $(t_{l1}, t_{h1})$, the server computer 102 can be configured to merge the values of the temporal metadata partitions 124 and create a merged temporal metadata partition 124 having a time range $(t_{l1}, t_{h1})$. The data values of the temporal metadata partitions 124 can be merged in any number of ways including, but not limited to, averaging the data values, summing the data values, otherwise modifying the data values, combinations thereof, or the like. In some embodiments, the temporal metadata partitions 124 can contain records $r_1$ and $r_2$. These records $r_1, r_2$ can have ranges $(tl_1, th_1)$ and $(tl_2, th_2)$, respectively. Furthermore, these records $r_1, r_2$ can be otherwise identical. In such a case, the records $r_1, r_2$ can be merged into a single temporal metadata partition 124. Because the temporal metadata partitions 124 can be merged in additional and/or alternative ways, it should be understood that these examples of merging data values are illustrative, and should not be construed as being limiting in any way.

From operation 406, the method 400 proceeds to operation 408, wherein the server computer 102 saves the temporal metadata partition 124. In particular, the server computer 102 can save the temporal metadata partition 124 generated by merging the temporal metadata partitions 124 in operation 406 in the data store 120. Because the temporal metadata partition 124 can be saved to additional and/or alternative data storage devices, it should be understood that this embodiment is illustrative, and should not be construed as being limiting in any way.

From operation 408, the method 400 proceeds to operation 410. The method 400 ends at operation 410.

Figure 5:
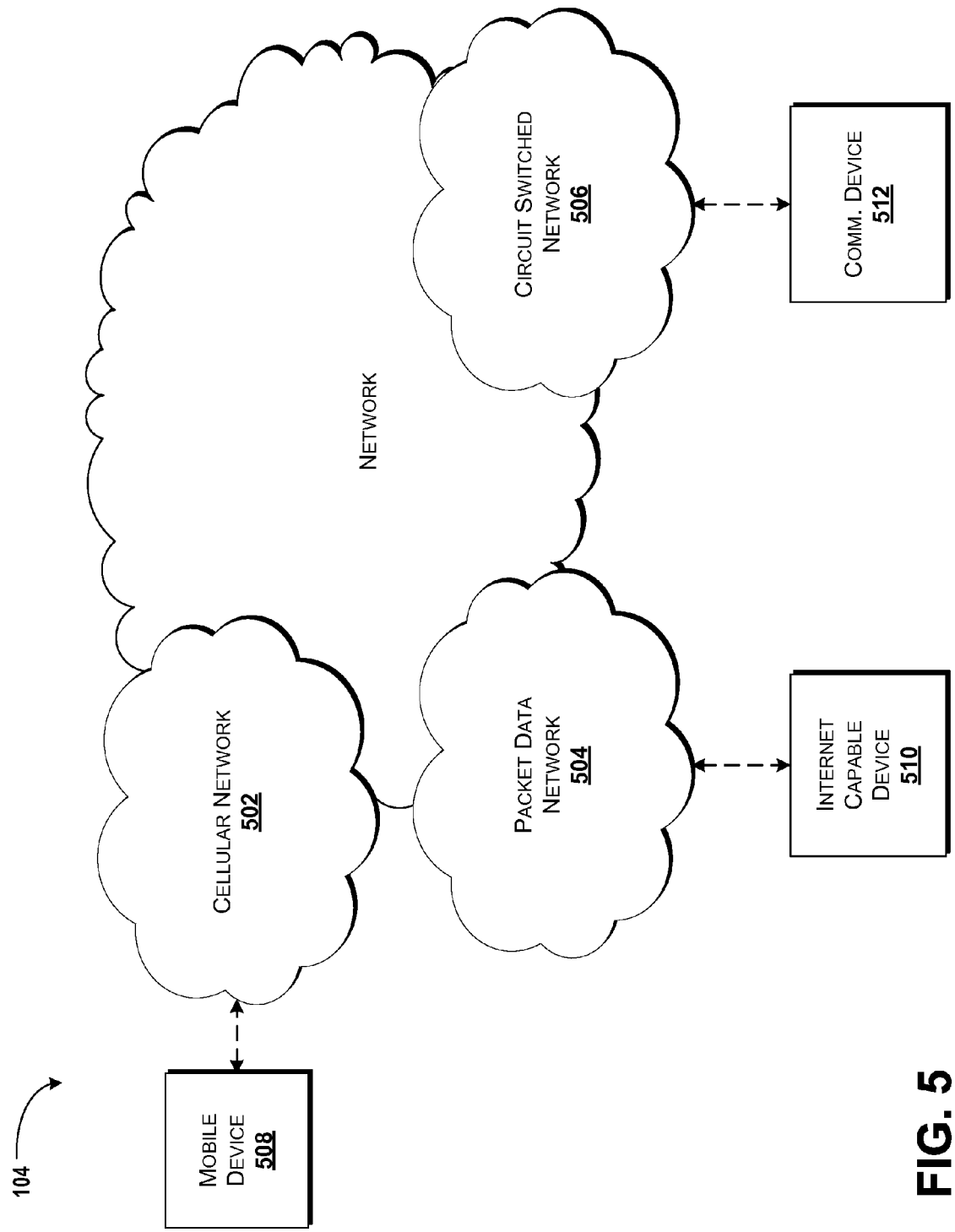
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
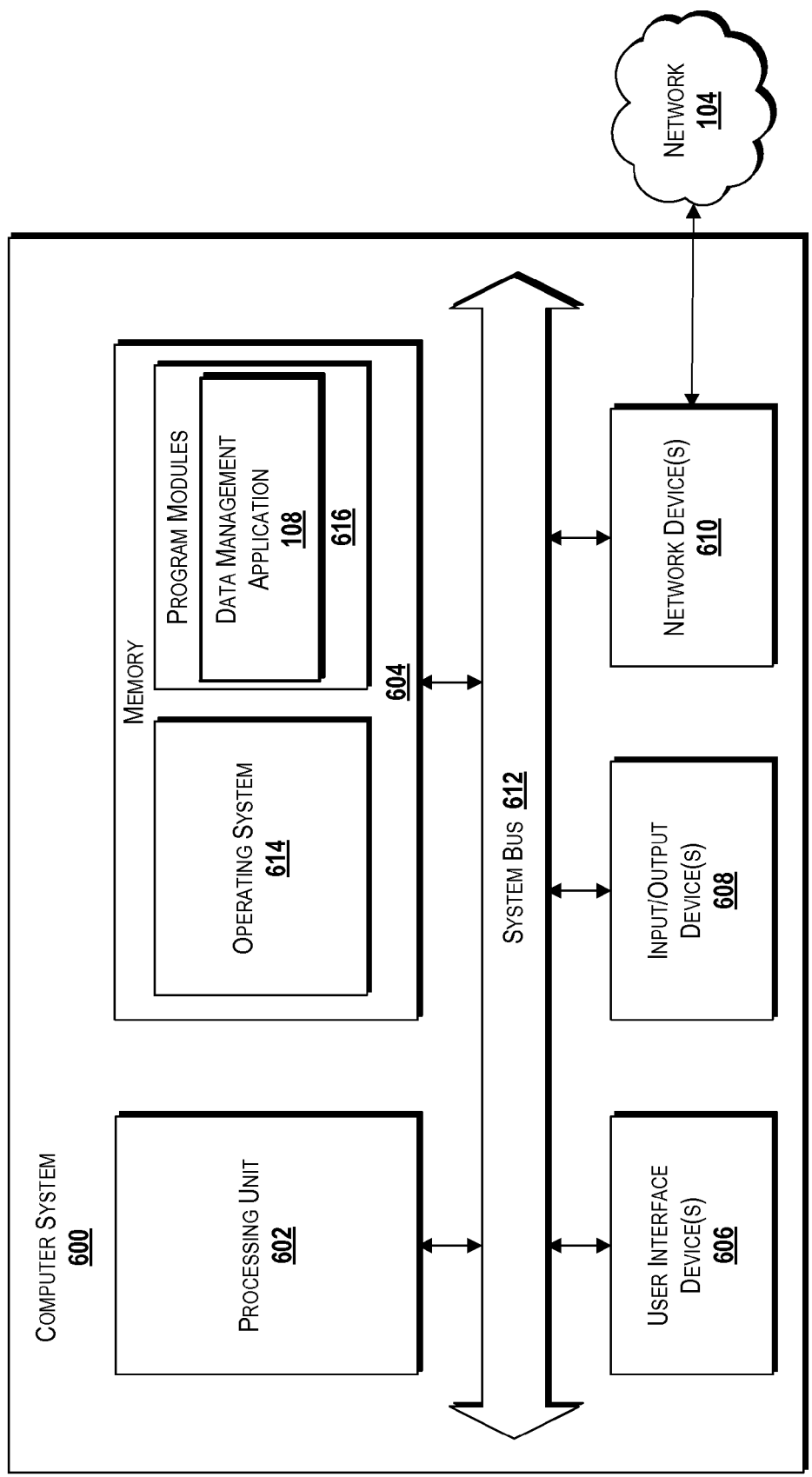
FIG. 6 is a block diagram illustrating an example computer system configured to generate and use temporal data partition revisions, according to some illustrative embodiments.

FIG. 6 is a block diagram illustrating a computer system 600 configured to provide the functionality described herein generating and using temporal data partition revisions, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the data management application 108. This and/or other programs can be embodied in computer-readable media containing instructions that, when executed by the processing unit 602, perform one or more of the methods 200-400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store data from one or more of the data streams 110, the temporal data partitions 122, the temporal metadata partitions 124, the queries 128, the results 130, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for generating and using temporal metadata partitions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    obtaining metadata at a server computer executing a data management application, the metadata comprising a data value and a time range associated with the data value;
    analyzing, by the server computer, the time range to identify a temporal metadata partition in which the metadata is to be stored;
    storing, by the server computer, the metadata in the temporal metadata partition;
    determining, by the server computer based upon the time range, that the metadata is to be stored in a further temporal metadata partition;
    storing, by the server computer, the metadata in the further temporal metadata partition;
    determining that the temporal metadata partition and the further temporal metadata partition are to be merged; and
    merging the temporal metadata partition and the further temporal metadata partition.

2. The method of claim 1, wherein the metadata is included in a data stream generated by a data source.

3. The method of claim 1, wherein the metadata is included in a data stream generated by a data source, wherein the data stream comprises the metadata and event data, and wherein the metadata defines a context of the event data.

4. The method of claim 1, further comprising:
    receiving a query;
    executing the query against event data stored in a temporal data partition to obtain an event data query result;
    identifying, in the event data query result, a timestamp; and
    retrieving the metadata from a relevant temporal metadata partition based upon the timestamp.

5. The method of claim 4, further comprising:
    computing results based upon the metadata and the event data; and
    outputting the results.

6. The method of claim 5, wherein the metadata provides a context for the event data, and wherein computing the results comprises selecting event data based, at least partially, upon the metadata.

7. The method of claim 1, wherein determining that the temporal metadata partition and the further temporal metadata partition are to be merged comprises:
    selecting the temporal metadata partition; and
    identifying the further temporal metadata partition as a related temporal metadata partition.

8. The method of claim 1, wherein merging the temporal metadata partition and the further temporal metadata partition comprises:
    merging a time range of the temporal metadata partition with a further time range of the further temporal metadata partition to generate a merged temporal metadata partition having a merged time range and the data value; and
    storing the merged temporal metadata partition.

9. A system comprising:
    a processor; and
    a memory storing computer-executable instructions that, when executed by the processor, cause the processor to perform operations comprising
        obtaining metadata comprising a data value and a time range associated with the data value,
        analyzing the time range to identify a temporal metadata partition in which the metadata is to be stored,
        determining, based upon the time range, that the metadata is to be stored in a further temporal metadata partition,
        storing the metadata in the further temporal metadata partition,
        storing the metadata in the temporal metadata partition,
        determining that the temporal metadata partition and the further temporal metadata partition are to be merged, and
        merging the temporal metadata partition and the further temporal metadata partition.

10. The system of claim 9, wherein the computer-executable instructions, when executed by the processor, cause the processor to perform operations further comprising:
    receiving a query;
    executing the query against event data stored in a temporal data partition to obtain an event data query result;
    identifying, in the event data query result, a timestamp; and
    retrieving the metadata from a relevant temporal metadata partition based upon the timestamp.

11. The system of claim 10, wherein the computer-executable instructions, when executed by the processor, cause the processor to perform operations further comprising:
    computing results based upon the metadata and the event data; and
    outputting the results.

12. The system of claim 9, wherein the computer-executable instructions, when executed by the processor, cause the processor to perform operations further comprising:
- determining that the temporal metadata partition and the further temporal metadata partition are to be merged by
  - selecting the temporal metadata partition, and
  - identifying the further temporal metadata partition as a related temporal metadata partition; and
- merging the temporal metadata partition and the further temporal metadata partition by
  - merging a time range of the temporal metadata partition with a further time range of the further temporal metadata partition to generate a merged temporal metadata partition having a merged time range and the data value, and
  - storing the merged temporal metadata partition.

13. A computer storage medium having computer-executable instructions stored thereon that, when executed by a processor, cause the processor to perform operations comprising:
- obtaining metadata comprising a data value and a time range associated with the data value;
- analyzing the time range to identify a temporal metadata partition in which the metadata is to be stored;
- determining, based upon the time range, that the metadata is to be stored in a further temporal metadata partition;
- storing the metadata in the further temporal metadata partition;
- storing the metadata in the temporal metadata partition;
- determining that the temporal metadata partition and the further temporal metadata partition are to be merged; and
- merging the temporal metadata partition and the further temporal metadata partition.

14. The computer storage medium of claim 13, further comprising computer-executable instructions that, when executed by the processor, cause the processor to perform operations further comprising:
- receiving a query;
- executing the query against event data stored in a temporal data partition to obtain an event data query result;
- identifying, in the event data query result, a timestamp; and
- retrieving the metadata from a relevant temporal metadata partition based upon the timestamp.

15. The computer storage medium of claim 14, further comprising computer-executable instructions that, when executed by the processor, cause the processor to perform operations further comprising:
- computing results based upon the metadata and the event data; and
- outputting the results.

16. The computer storage medium of claim 13, further comprising computer-executable instructions that, when executed by the processor, cause the processor to perform operations further comprising:
- determining that the temporal metadata partition and the further temporal metadata partition are to be merged by
  - selecting the temporal metadata partition, and
  - identifying the further temporal metadata partition as a related temporal metadata partition; and
- merging the temporal metadata partition and the further temporal metadata partition by
  - merging a time range of the temporal metadata partition with a further time range of the further temporal metadata partition to generate a merged temporal metadata partition having a merged time range and the data value, and
  - storing the merged temporal metadata partition.

17. The computer storage medium of claim 13, wherein the metadata is included in a data stream generated by a data source, wherein the data stream comprises the metadata and event data, wherein the metadata defines a context of the event data, and wherein the temporal metadata partition and the further temportal metadata partition are stored at a distributed database.

* * * * *